(No Model.) 9 Sheets—Sheet 1.

J. GUZOWSKI.
POTATO DIGGER.

No. 466,752. Patented Jan. 5, 1892.

Fig. 1

WITNESSES:
G. J. Rollandet.
Wm. M. Connell

INVENTOR
Joseph Guzowski
BY
A. J. O'Brien
ATTORNEY.

(No Model.) 9 Sheets—Sheet 4.

J. GUZOWSKI.
POTATO DIGGER.

No. 466,752. Patented Jan. 5, 1892.

WITNESSES:
G. J. Rollandet
Wm. M. Connell

INVENTOR
Joseph Guzowski
BY
A. J. O'Brien
ATTORNEY.

(No Model.) 9 Sheets—Sheet 5.

J. GUZOWSKI.
POTATO DIGGER.

No. 466,752. Patented Jan. 5, 1892.

WITNESSES:
INVENTOR
Joseph Guzowski
BY
A. J. O'Brien
ATTORNEY.

(No Model.) 9 Sheets—Sheet 8.

J. GUZOWSKI.
POTATO DIGGER.

No. 466,752. Patented Jan. 5, 1892.

WITNESSES:
G. J. Rollandet
Wm. M. Connell

INVENTOR
Joseph Guzowski
BY
A. J. O'Brien
ATTORNEY.

(No Model.) 9 Sheets—Sheet 9.

J. GUZOWSKI.
POTATO DIGGER.

No. 466,752. Patented Jan. 5, 1892.

WITNESSES:
G. J. Rollandet
Wm. M. Connell

INVENTOR
Joseph Guzowski
BY
A. J. O'Brien
ATTORNEY.

UNITED STATES PATENT OFFICE.

JOSEPH GUZOWSKI, OF DENVER, COLORADO, ASSIGNOR OF ONE-THIRD TO FRANK SWIONTKOWSKI, OF SAME PLACE.

POTATO-DIGGER.

SPECIFICATION forming part of Letters Patent No. 466,752, dated January 5, 1892.

Application filed February 25, 1891. Serial No. 382,829. (No model.)

*To all whom it may concern:*

Be it known that I, JOSEPH GUZOWSKI, a citizen of Germany, residing at Denver, in the county of Arapahoe and State of Colorado, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of machines known as "potato-diggers," and is more particularly designed for accomplishing the purpose which its name indicates, though it may be used equally well in digging and gathering turnips, beets, &c., since it is provided with devices for cutting off the tops of these vegetables as the machine moves along, these cutters being located just in advance of the plows. Hence the tops are removed while the roots are firmly held in the ground, which condition facilitates the operation, as will be readily observed.

My improved machine is believed to possess many advantages over those now on the market or in use for a similar purpose. It is a machine thoroughly practicable, reliable and durable in use, easily operated, being so constructed and arranged that one man may successfully operate the entire machine from a seat centrally located upon the frame-work.

My improved machine also possesses great capacity and is capable of unlimited adjustment, since it may be so regulated as to answer all the conditions and requirements of a machine of this class.

The machine will be fully understood by reference to the accompanying drawings, wherein is illustrated an embodiment of the invention.

In the drawings, Fig. 2 is a side elevation of the same, while Fig. 3 illustrates in side elevation the front portion or that portion which is removed in Figs. 1 and 2. Fig. 5 is a side elevation, partially in section, of the mechanism illustrated in Fig. 4, while Figs. 6 and 7 are details of the same. Fig. 12 is a side elevation of the mechanism illustrated in Fig. 11, while Fig. 14 is a transverse section taken through the frame on the line $x$ $x$, Figs. 1 and 2, the mechanism in the rear being shown in front elevation, while Fig. 15 is a side elevation of the same. Figs. 16, 17, and 18 are details of the mechanism shown in the last two figures, the last figure being a section taken on the line $a$ $a$, Fig. 14.

In the views, wherein similar reference characters designate corresponding parts of named space a large proportion of the dirt drops. The elevator 56 now takes the vegetables, together with the dirt which has escaped space 57, and carries them over a shaking or vibrating screen 58, where they are deprived of the balance of the dirt preparatory to their discharge into a receptacle 59, located at the rear of the machine and suitably supported for their reception. The elevator consists of transverse slats 60, having their extremities secured to endless belts 61, traveling over suitable pulleys 62, mounted on shafts 63, journaled in movable blocks at the top. The pulleys supporting the elevator at the bottom are mounted upon a shaft 63$^a$, journaled in the longitudinal side beams 11. The inclination of the elevator, together with the screen 58, is regulated by the use of hand-screws 64, passing through a bar 66, connecting suitable upright supports 65, secured upon the top of side beams 10. These screws rotate freely in bar 66, but have no movement longitudinally therein. The screws are not threaded where they pass through this bar, and a sliding movement is prevented by suitable collars which act as stops, one of the collars being secured to the screw on each side of bar 66, which they engage. The extremities or lower portions of these screws are threaded and enter suitable correspondingly-threaded sockets formed in bar 67, which connects the supporting-bars 68, one on each side and rigidly secured to the sides of the elevator-frame. It will be observed that by turning these screws the inclination of the elevator and its attachments can be regulated to suit the purpose. The longitudinal tension of the elevator is regulated by two hand-screws 93, which pass through a rear transverse strip 94, connecting guide-frames 95, secured to the sides of the elevator-frame and projecting in the rear thereof. The screws are provided with collars on each side of this strip, so that they have no longitudinal movement therein. The extremities of these screws are threaded and enter suitable correspondingly-threaded sockets formed in movable blocks 96, in which are journaled the extremities of the shaft 63, supporting the upper elevator-pulleys. It will thus be seen that by turning these screws the tension of the elevator may be increased or diminished, as may be desired. The screen 58 is permitted a slight lateral or shaking movement between the sides of the elevator-frame. This movement is imparted by an eccentric wheel 69 and a pitman 70, the latter being pivoted at one extremity to a wrist on the eccentric and connected at the opposite extremity with the screen by any suitable joint or in any suitable manner. The eccentric 69 is rigidly secured to one extremity of a horizontal shaft 71, supported by and journaled within suitable boxes 72, attached to side beams 11. The opposite extremity of shaft 71 is provided with a bevel gear-wheel 73, meshing in another similar wheel 74, made fast to one extremity of a transverse shaft 75, which extends across the machine and has its extremities journaled in suitable boxes 76, secured to beams 11. Shaft 75 is also further supported by the beams 77, centrally located between beams 11 and provided with journal-boxes 78 for said shaft. Motion is communicated to shaft 75 from another transverse shaft 79, located in the rear of shaft 75 and journaled in beams 11 and 77, which are provided with suitable journal-boxes. Shaft 79 is provided with a clutch gear-wheel 82, loosely mounted on the shaft and provided with teeth adapted to engage corresponding recesses formed in a fast pulley 83, which slides readily on the shaft for the purpose of throwing the machine in or out of gear. Gear-wheel 82 meshes with another similar wheel 84, rigidly secured to the shaft 75.

Sliding pulley 83 is manipulated by a lever 85, fulcrumed and guided in a suitable support 86, secured to the frame-work in any suitable manner. This lever is pivoted at its lower extremity to an arm 87, which is in turn pivoted to a lever 88, provided with a fulcrum 89, made fast to one of the beams 10. The opposite extremity of this lever is pivoted to an arm 90, which slides in a suitable aperture formed in one of the beams 10, and is connected at its opposite extremity with an arm 91, the lower extremity of which engages a circumferential groove 92, formed in the periphery of sliding pulley 82. Lever 85 is located in the vicinity of the driver's seat, as shown, so that it may be manipulated and the machine thrown in or out of gear by the driver without leaving his seat.

Figures 22, 23:
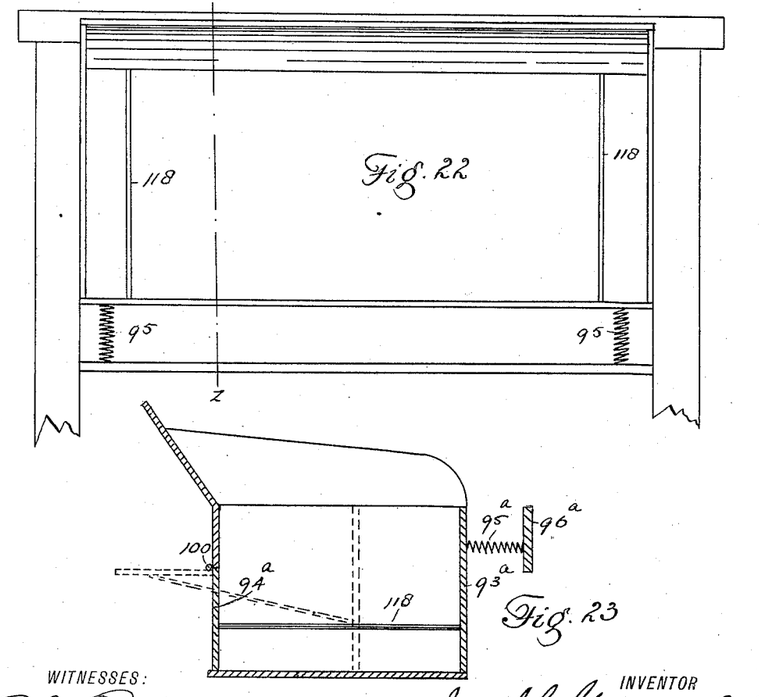
Fig. 22 is a plan view of a box located at the rear extremity of the machine for the reception of the vegetables discharged from the elevator.
Fig. 23 is a vertical section taken on the line $z$ $z$, Fig. 21.
Figure 24:
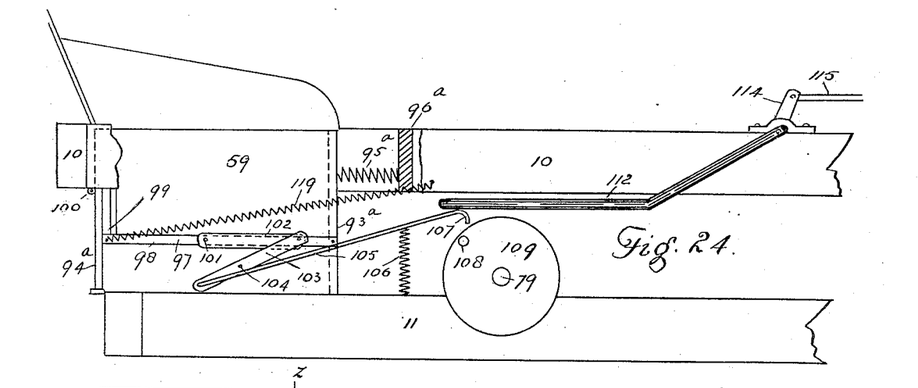
Fig. 24 is a side elevation, partially in section, the frame-work on one side being broken away, illustrating the box shown in Figs. 22 and 23, in connection with mechanism for discharging the vegetables therefrom.

The receptacle or box 59, to which reference has been heretofore made, is located in the extreme rear of the machine and between the longitudinal beams 10, to which the box is securely fastened. The peculiar feature of this box consists in its being so constructed that its contents can be automatically discharged therefrom by the movement of a lever within reach of the driver. This construction is illustrated in Figs. 22, 23, and 24. Let the numerals 93$^a$ and 94$^a$ designate the front and rear sides, respectively, of this box. The front side of this box is held in its normal position by a cart-spring 95$^a$, secured at one extremity to a stationary cross-bar 96$^a$, secured at its extremities to beams 10. At each end of the box is located a sliding bar 97, which is supported from below by a suitable base 98, which, as shown in the drawings, consists of the lower portion of the end of the box, which is set out to one side of the plane of the top portion of said end, thus making the box larger at the base. Bars 97 are provided above with guide-blocks 99, which engage the upper surface of these bars and cross them when acted upon to move in a direct line. Bars 97 are secured at their forward extremities E to side 93 of the box, while their opposite extremities engage the rear side of the box, but are not secured thereto. The rear side of the box forms the door, which is hinged at its upper edge, as shown at 100, so that when it swings it will open outward, every point in the lower edge describing the arc of a circle having the hinge-pin for a center. At a suitable point 101 on each of the bars 97 is pivoted one extremity of an arm 102, the opposite extremity of said arm being pivoted to one end of a lever 103, having its fulcrum 104 made fast to the lower portion of the end of the box, the opposite extremity of the lever being pivoted to an arm 105, extending forward and supported at a suitable point by a spring 106. This arm terminates at its forward extremity in a hook 107, adapted to engage a pin 108, made fast to a wheel 109, rigidly secured to the main driving-shaft 79, heretofore described, and to which motion is transmitted from the rear axle 110 through the medium of a belt or chain 111, passing around a pulley or sprocket-wheel mounted upon the axle and shaft 79. Hook 107 is normally disengaged from pin 108 by the action of spring 106. The hook may, however, be pressed to engagement with the pin by a bar 112, the rear extremity of which engages the forward extremity of arm 105. Bar 112 is rigidly secured at its forward extremity to a transverse shaft 113, suitably journaled to beams 10. Shaft 113 is provided with an arm 114, rigidly secured thereto and pivoted at its upper extremity to an arm 115, the opposite extremity of said last-named arm being pivoted to the lower extremity of an upright lever 116, fulcrumed and guided in a support 117, suitably secured to the main frame-work within reach of the driver's seat. The sides of box between its ends are connected by rods 118, the extremities of which are pivoted to the inner surface of said sides.

From the construction just described it will be observed that by the proper manipulation of lever 116 the hook 107 may be pressed to engagement with pin 108 on wheel 109. The rotation of this wheel then carries arm 105 forward and throws sliding arm 97 backward through the medium of lever 103 and arm 102. This movement of arms 97 draws side 93$^a$ backward and simultaneously opens door 94$^a$ by virtue of the mechanism heretofore described. This movement of side 93$^a$ forces the contents of the box out through the opening formed by swinging door 94$^a$ outward. Side 93$^a$ is returned to its normal position after discharging the contents of the box by the action of spring 95$^a$. This movement of side 93$^a$ also closes door 94$^a$, since these parts are connected by rods 118, as before exhibited.

To insure the returning of the parts 93$^a$ and 94$^a$ to their normal positions, I have provided an additional spring 119 on each side of the machine, connected at one extremity with a beam 10 and at the opposite extremity with bar 97. Springs 95$^a$ and 119 act against the rearward movement of side 93$^a$ and the opening of the door 94$^a$. Hence as soon as the power acting on these parts ceases to be effective the springs return side 93$^a$ to its normal position and close the door 94$^a$.

Figure 25:
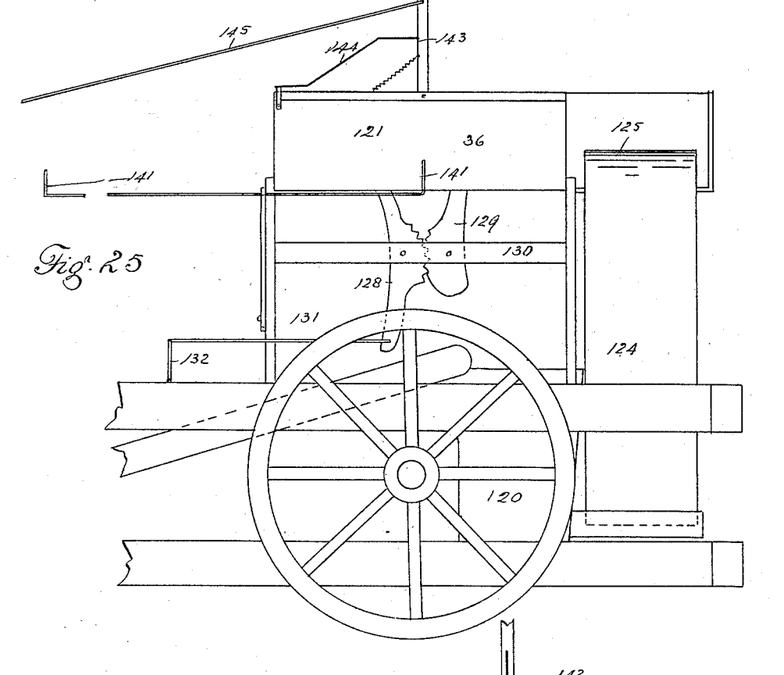
Fig. 25 is a side elevation of the rear portion of the machine, illustrating a modified form or receptacle for the vegetables.
Figure 26:
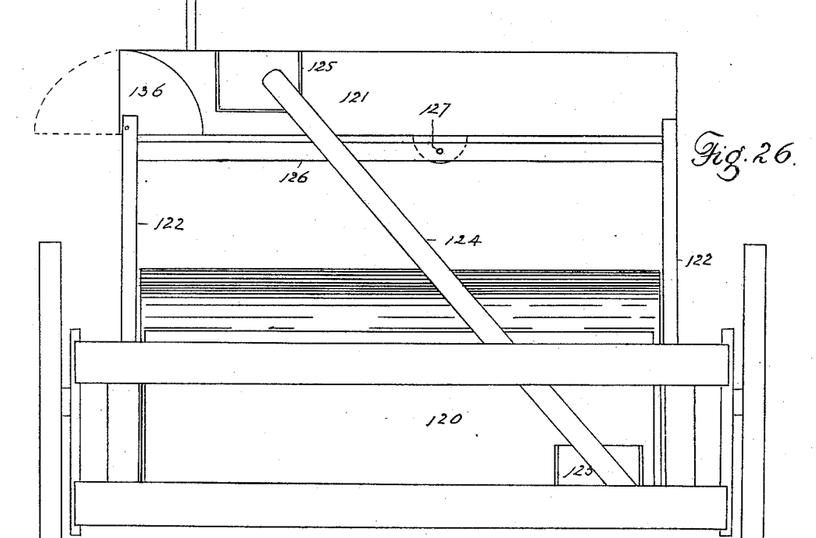
Fig. 26 is a rear view of the same.
Figure 27:
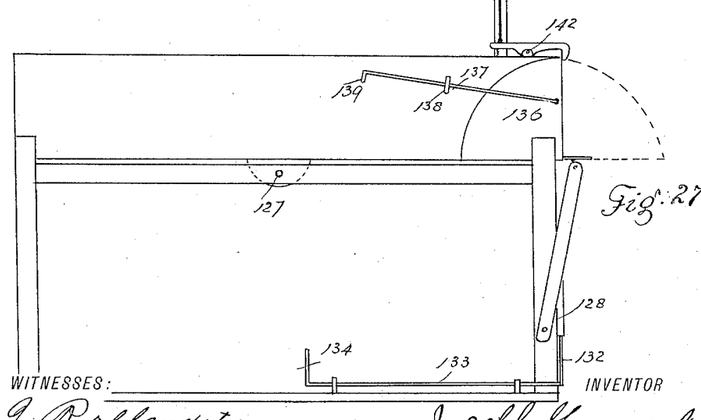
Fig. 27 is a rear view in detail of the upper box of the modified form of mechanism shown in Figs. 25 and 26.

In Figs. 25, 26, and 27 is shown a modified form of mechanism, consisting of a box 120, suitably supported and located beneath the discharge-extremity of the elevator, and another receptacle 121, located above box 120 and supported upon legs 122, secured to beams 10. Box 120 is provided with a suitable discharge-opening 123, from which the contents of the box pass to an elevator 124, by means of which they are carried to box 121, being first discharged into a rear extension or trough 125. Box 121 is centrally pivoted to cross-beams 126, connecting legs 122, which extend above the bottom of the box, the ends of which move freely between these projections, which movement is necessary in tilting the box for the purpose of discharging its contents whenever it may be necessary or desirable to do so. The pivot 127 is located to one side of the center, so that normally the discharge-extremity of the box occupies a lower position than the opposite extremity, so that the contents of the box will slide therefrom as soon as the door is opened. The box is held in the horizontal position by a pair of cams 128 and 129, which are pivoted to a cross-bar 130, connecting two of the legs 122. These cams are notched or toothed on one side, and the teeth of one engage those of the other, whereby their movement is simultaneous. The lower extremity of cam 128 is pivoted to an arm 131, the opposite extremity of said arm being pivoted to a crank 132, rigidly secured to a shaft 133, provided with another crank 135 at its free extremity. The cams may be operated by the use of this crank and are so shaped that when in the upright position they engage the discharge extremity of box 121 beneath the bottom and support the box in a horizontal position. When, however, it is desired to lower the discharge extremity of this box, the proper manipulation of arm 131 by the use of crank 134 removes the cams from engagement with the box, when the discharge extremity thereof drops to a lower plane. This extremity of the box is provided with a door 136, suitably hinged at the bottom, so that it opens outward, as shown in Figs. 26 and 27. This door is provided with side rods 137, adapted to slide in guides 138, said rods being provided with hooked extremities 139, adapted to engage the guides 138 when the door has reached the proper outward limit of movement. The door is closed by the use of rod 140, suitably pivoted and supported and provided at each extremity with cranks 141, and is locked in the closed position by a hook 142, pivoted to the top of the box. This hook is raised for the purpose of unlocking the door by the use of a lever 143, connected with the hook by a rod 144 and actuated by the use of a rod 145, leading to any suitable point, as near the driver's seat.

Supported in front of the diggers 46, heretofore described, are adjustable devices 146, which are adapted to clear the way for the diggers by removing all obstructions, and may be so set as to break the frozen earth in front of the diggers, thus permitting the operation of the machine at times when without these devices work would be impossible or very difficult. The device proper is provided with a vertical arm 147, which moves in suitable apertures and is guided by the cross-beams 22, the side projections 148, and a roller 149, pivoted in these projections. Arm 147 is provided with a cogged rack 150, which is engaged by a correspondingly-cogged wheel 151, mounted upon a shaft 152, to which is rigidly secured an arm 153 to the upper extremity of which is pivoted one extremity of an arm 154, the opposite extremity of said arm being pivoted to the lower extremity of a lever 155, by the manipulation of which device it will be observed wheel 151 is rotated and the device 146 adjusted to suit the purpose.

Located in front of the mechanism just described, and in line with the diggers, are the devices adapted to cut and clear away the vines and tops of the vegetables in advance of the diggers, thus removing all obstacles, obstructions, or hinderances to the proper performance of the function of the diggers and their attachments. These clearing devices will now be described in detail.

Let the reference-numeral 156 designate a rotating vertical shaft, one on each side of the machine and journaled in front cross-beams 23. To the lower extremity of each of these shafts is rigidly secured a toothed disk 157, forming in effect a circular saw lying in a horizontal plane and working between stationary toothed guards 158 and 159, formed integral with or rigidly secured to an upright vertically-movable arm 160, forming a right angle with the guards. Arm 160 is dovetailed into cross-beam 23, as shown in Fig. 18. The upper portion 162 of arm 160 is circular in cross-section and provided with a guide-arm 163, which is rigidly secured thereon, or it may be adjustable by means of a set-screw, so that when adjusted it is rigid on the vertical arm 162, and is provided with an aperture through which passes a stationary vertical bar 164, upon which arm 163 is adapted to slide. Bar 164 is provided with a coil-spring 165 both above and below the guide-arm 163. By means of this mechanism the entire device, connected with arm 160, may adapt itself to the condition of the ground—as, for instance, it may rise to pass over an obstacle and again return to its normal position by the action of springs 165. Rigidly secured to shaft 156, and located immediately above guard 159, is a toothed cylinder 151, adapted to catch the vines or tops severed by the toothed cutter and throw the same to one side of the machine or out of the path of the diggers.

Located upon shaft 156, just above cross-bar 23$^a$, is the small bevel gear-wheel 166, provided with a collar 167, and secured upon the shaft by means of a feather or spline, so that it rotates therewith, the shaft having a free sliding movement therethrough, which movement is necessary to the automatic action of the mechanism heretofore described.

Meshing in pinion 166 is another bevel gear-wheel 167$^a$, rigidly mounted upon a shaft 168, journaled in a support 169, seated upon beam 23$^a$. The inner extremity of shaft 168 is journaled in a suitable box 169$^a$, seated upon the longitudinal beam 24. Shaft 168 is further provided with a sprocket-wheel 170, rigidly mounted thereon and connected by means of a chain 171 with another similar wheel 172, rigidly mounted upon a shaft 173, provided with suitable journal-boxes 174, secured to longitudinal beams 24, 24, and 10. The extremity of said shaft is provided with a pulley, over which passes a belt 175, connecting the last-named pulley with another pulley 176, mounted on shaft 53.

Figure 1:
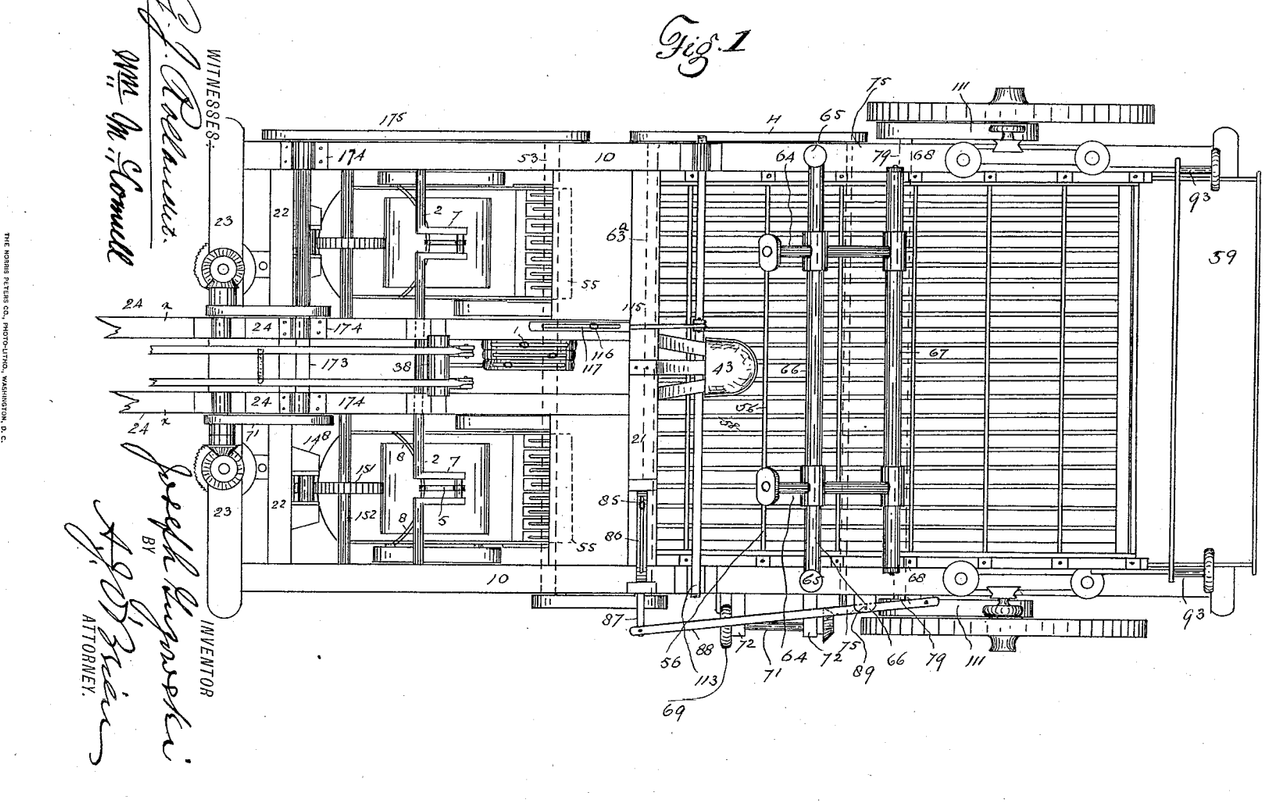
Figure 1 is a top or plan view of my improved device, the front portion being broken away for lack of space.
Figures 2, 3:
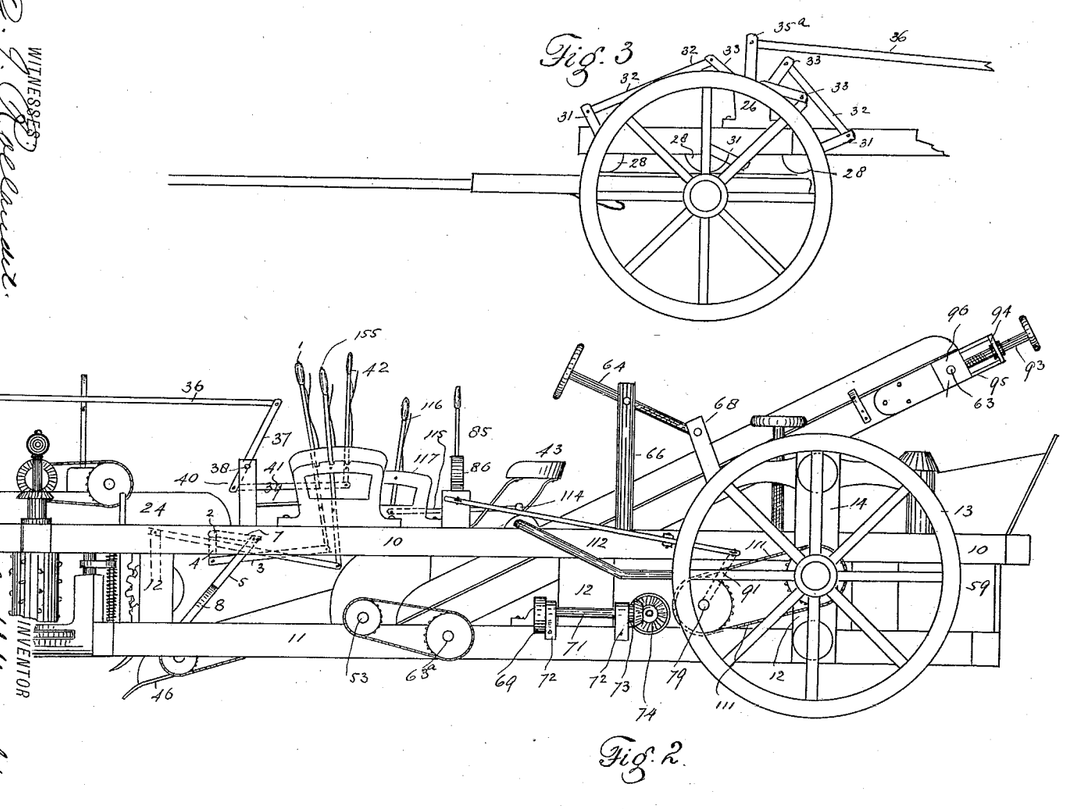
Figure 4:
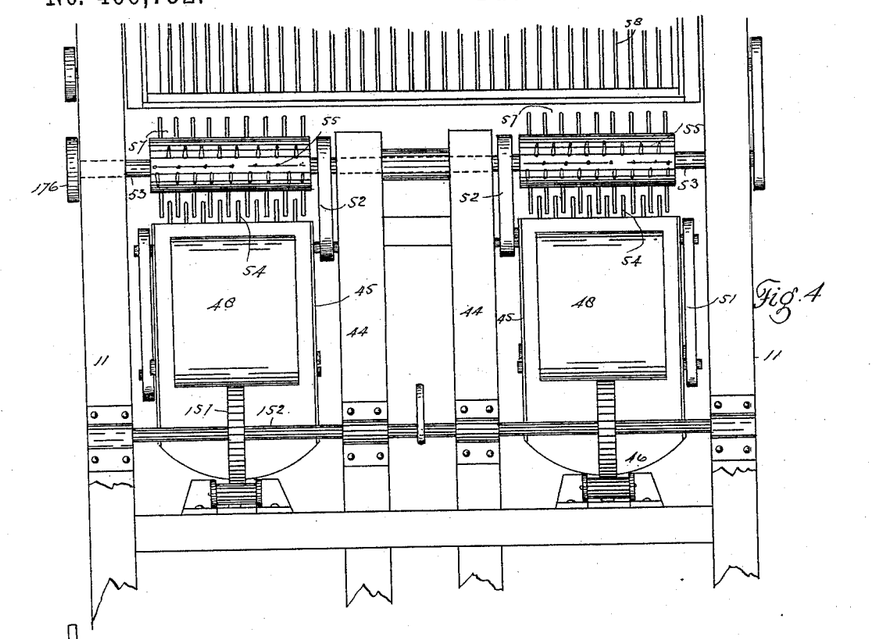
Fig. 4 is a plan view of the central portion of the machine with the upper part removed. In this view the front and rear portions of the machine are broken away.
Figures 5, 6, 7:
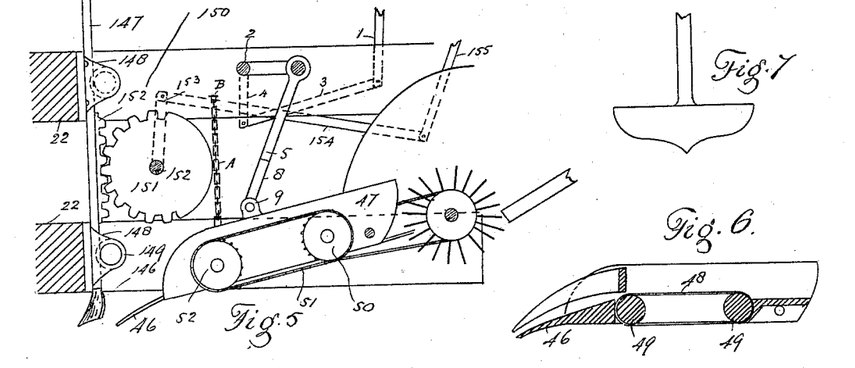
Figure 8:
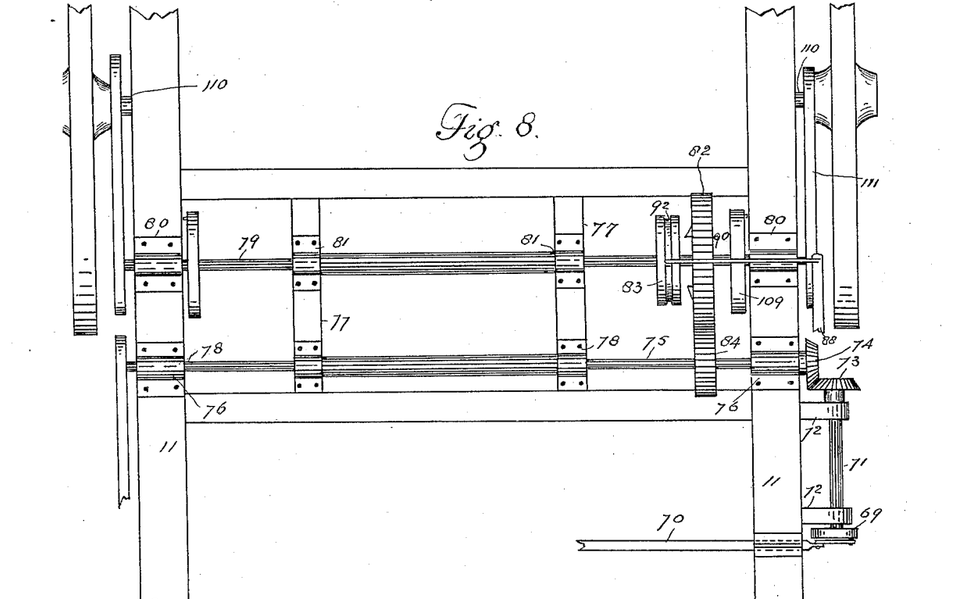
Fig. 8 is a top view of the mechanism located just in the rear of that shown in Fig. 5. In this view the elevator and its attachments are removed.
Figure 9:
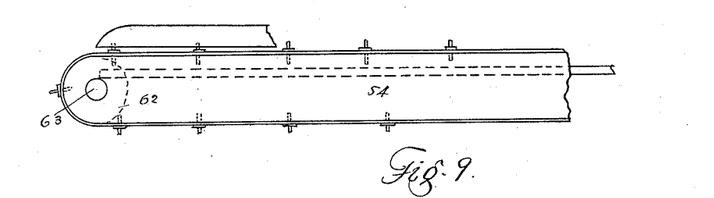
Fig. 9 is a side elevation of the elevator, partially broken away.
Figure 10:
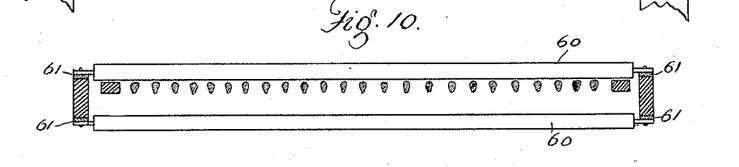
Fig. 10 is a transverse section of the elevator.
Figure 11:
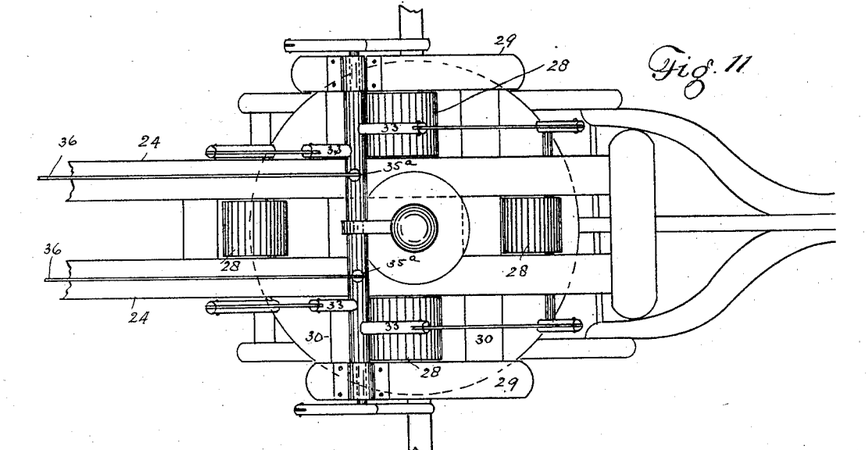
Fig. 11 is a plan view illustrating means of connecting the main frame with the forward axle, also means of raising and lowering the forward portion of the frame by the use of eccentrics actuated by manipulating a lever located near the driver's seat in the rear.
Figure 12:
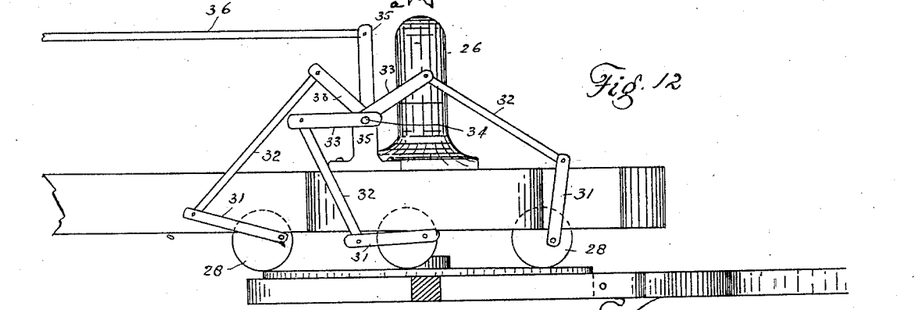
Figure 13:
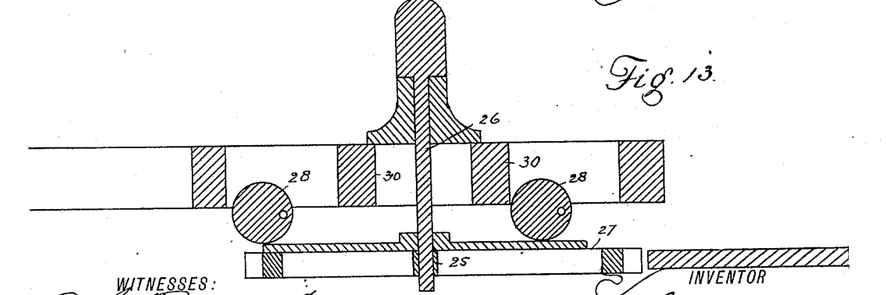
Fig. 13 is a longitudinal section of the same, taken through the center.
Figure 19:
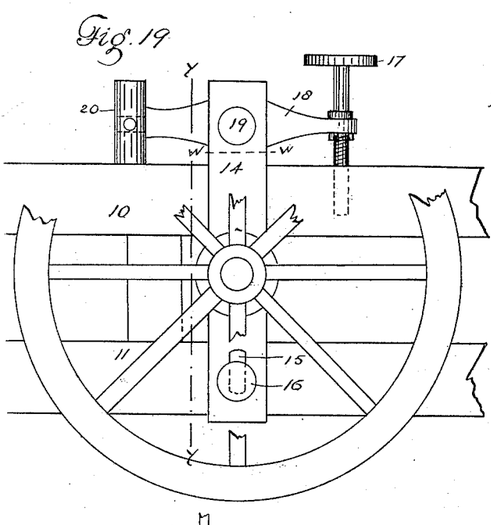
Fig. 19 is a side view of the rear portion of the mechanism, one of the rear wheels being partially broken away. This view illustrates the manner of raising and lowering the rear extremity of the frame-work.
Figures 20, 21:
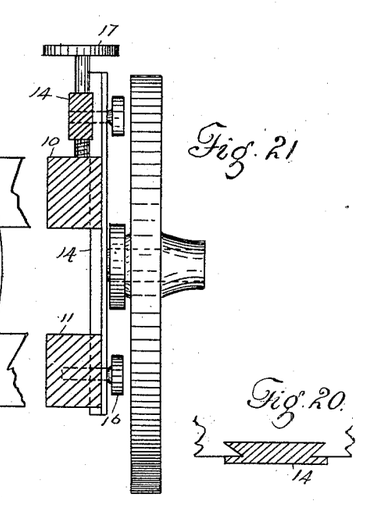
Fig. 20 is a horizontal section in detail, taken on the line $w$ $w$, Fig. 19.
Fig. 21 is a vertical section taken on the line $y$ $y$, Fig. 19.

From the foregoing description it is thought the operation of the mechanism will be fully understood. It is, however, thought best to give a brief connected description of this operation, which is as follows: Motion is communicated from the rear axle by two belts or chains 111 to shaft 79, provided with the clutch gear-wheel 83, meshing with a gear-wheel 84 on shaft 75. (See Fig. 8.) From the last-named shaft motion is transmitted, through the medium of gears 74 73, shaft 71, eccentric 69, and pitman 70, to screen 56; also, through the medium of a shaft H, to shaft 63$^a$, supporting the lower extremity of the elevator 56 and transmitting motion thereto. From shaft 63$^a$ motion is transmitted to shaft 53, carrying toothed rollers 55. From shaft 53 motion is communicated through the medium of belts 52 and suitable pulleys to apron 48; also, by means of belt 175 to shaft 173 and thence to shaft 168 and vertical shaft 156 by virtue of the construction and arrangement heretofore described.

It will be observed that when the terms "belt" and "pulley" are used they are intended to include chain and sprocket wheel.

Having thus described my invention, what I claim is—

1. In a potato-digger, the combination, with a frame, of digging mechanism carried thereby, uprights vertically movable in the said frame, front wheels for the said frame, rear wheels journaled in the said uprights, arms pivoted to the said uprights and having one of their ends pivoted to the said frame, and screws passing through the opposite ends of the said arms and taking into the frame, as described.

2. In a potato-digger, the combination, with a frame, of digging mechanism carried thereby, rear wheels for the said frame, front wheels, a platform carried by the said front wheels, cams pivoted to the forward end of the said frame and bearing on the said platform, and means for actuating the said cams, substantially as described.

3. In a potato-digger, the combination, with a frame, of digging mechanism carried thereby, uprights vertically movable in the said frame, rear wheels journaled in the said uprights, arms pivoted to the said uprights and having one of their ends pivoted to the said frame, and screws passing through the opposite ends of the said arms and taking into the frame-work, front wheels, a platform carried by the said wheels, cams pivoted to the forward end of the said frame and bearing on the said platform, and means for actuating the said cams, substantially as described.

4. In a potato-digger, the combination, with a suitable frame, of a guard-plate vertically movable therein and having a beveled lower edge, whereby it will be raised by obstructions, a vertical movable shaft and a serrated disk mounted upon the said shaft and adapted to be driven thereby, substantially as described.

5. In a potato-digger, the combination, with a suitable frame, of a guard-plate vertically movable therein and having a beveled lower edge, whereby it will be raised by obstructions, a vertical spline-shaft, a serrated disk rigidly secured thereto above the said guard-plate, a cog-wheel slidingly mounted upon the said shaft, and mechanism for imparting motion to the said wheel.

6. In a potato-digger, the combination, with a suitable frame, of a guard-plate vertically movable therein and having a beveled lower edge, whereby it will be raised by obstructions, a vertical shaft, a serrated disk mounted upon the said shaft and adapted to be driven thereby, and a serrated cylinder carried by the said shaft above the said disk and adapted to throw to one side the severed portions of vines, weeds, &c., substantially as described.

7. In a potato-digger, the combination, with a suitable frame, of a vertical guard-plate vertically movable therein and having a beveled lower edge, whereby it will be raised by obstructions, a vertical shaft, a serrated disk mounted upon the said shaft and adapted to to be driven thereby, and a spring tending to force the said guard-plate to its lowest position, as described.

8. In a potato-digger, in combination with a receptacle having opposite hinged sides, of a rod connecting the said sides, and means whereby the rod may be actuated, causing one of the said sides to swing out and the other to swing within the receptacle, substantially as described.

9. In a potato-digger, the combination, with a receptacle having opposite hinged sides, of springs tending to close the said sides, a rod connected to the front hinged side of the said box and bearing against the rear hinged side thereof, and means whereby the said rod may be moved rearwardly, as described.

10. In a potato-digger, the combination, with a receptacle having opposite hinged sides, of springs tending to close the said sides, a rod connected to the front hinged side of the said box and bearing against the rear hinged side thereof, a pivoted lever having its one end connected to the said rod, an arm having its opposite end secured to the free end of the said lever, and a rotating wheel having a projection thereon with which the hook may be engaged when desired, substantially as described.

In testimony whereof I affix my signature in presence of two witnesses.

JOSEPH GUZOWSKI.

Witnesses:
 WM. MCCONNELL,
 F. H. JOHNSON.